(12) United States Patent
Burton et al.

(10) Patent No.: US 11,542,018 B2
(45) Date of Patent: Jan. 3, 2023

(54) UNIFORM HEAT DISTRIBUTION IN RESISTIVE HEATERS FOR ANTI-ICING AND DE-ICING

(71) Applicant: Battelle Memorial Institute, Columbus, OH (US)

(72) Inventors: Brett Burton, Columbus, OH (US); Amy M. Heintz, Dublin, OH (US); Kurt Bosworth, Columbus, OH (US); Tony Duong, Columbus, OH (US); Mike Jansen, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 452 days.

(21) Appl. No.: 14/988,742

(22) Filed: Jan. 5, 2016

(65) Prior Publication Data
US 2016/0221680 A1 Aug. 4, 2016

Related U.S. Application Data

(60) Provisional application No. 62/100,440, filed on Jan. 6, 2015.

(51) Int. Cl.
*H05B 3/68* (2006.01)
*B64D 15/12* (2006.01)
(Continued)

(52) U.S. Cl.
CPC ............. *B64D 15/12* (2013.01); *H05B 3/146* (2013.01); *H05B 3/34* (2013.01);
(Continued)

(58) Field of Classification Search
CPC ........ B64D 15/00; B64D 15/12; B64D 15/14; H05B 2203/002–009;
(Continued)

(56) References Cited

U.S. PATENT DOCUMENTS 2,628,299 A * 2/1953 Gaiser ..................... H05B 3/84
148/24
3,813,519 A 5/1974 Luerssen et al.
(Continued)

OTHER PUBLICATIONS

Itkis, M.E. D.E. Perea, S. Niyogi, S.M. Rickard, M.A. Hamon, H. Hu, B. Shao, and R.C. Haddon, "Purity Evaluation of As-prepared Single-Walled Carbon Nanotube Soot by use of Solution-Phase Near-IR Spectroscopy," Nano Lett. 2003, 3(3), 309.
(Continued)

*Primary Examiner* — Sang Y Paik
(74) *Attorney, Agent, or Firm* — Susanne A. Wilson; Frank Rosenberg

(57) ABSTRACT

Configurations are described that provide uniform heat distribution of resistive heaters. These configurations allow successful anti-icing and deicing with relatively low applied power. One aspect involves the use of a thin film heater applied just underneath the topcoat to efficiently direct all heat to the surface, allowing anti-icing and de-icing with minimal power. This can be accomplished by employing a hybrid electrode interface, using a metal foil or metal braid that is attached to the aircraft surface with a structural adhesive that has been smoothed along the edges with metal-filled adhesive. Another aspect uses an array of heater cells created as a single sheet and a heat spreading material, provided underneath or overtop of the heater cells.

20 Claims, 5 Drawing Sheets

(51) Int. Cl.
*H05B 3/34* (2006.01)
*H05B 3/14* (2006.01)

(52) U.S. Cl.
CPC .. *H05B 2203/011* (2013.01); *H05B 2203/013* (2013.01); *H05B 2214/02* (2013.01); *H05B 2214/03* (2013.01); *H05B 2214/04* (2013.01)

(58) Field of Classification Search
CPC ..... H05B 2203/01–011; H05B 2203/012–013; H05B 2214/00; H05B 2214/02; H05B 2214/03; H05B 2214/04; H05B 3/145; H05B 3/146; H05B 3/34
USPC .......... 219/200–203, 522, 538–548; 977/742
See application file for complete search history.

(56) References Cited

U.S. PATENT DOCUMENTS

| | | | | |
|---|---|---|---|---|
| 3,923,581 | A * | 12/1975 | Payne | B41J 2/34 |
| | | | | 156/291 |
| 4,443,691 | A * | 4/1984 | Sauer | B32B 17/10 |
| | | | | 219/203 |
| 4,488,033 | A * | 12/1984 | Trachtenberg | H05B 3/84 |
| | | | | 156/574 |
| 5,250,228 | A * | 10/1993 | Baigrie | C08K 3/04 |
| | | | | 219/541 |
| 5,925,275 | A | 7/1999 | Lawson | |
| 6,683,783 | B1 | 1/2004 | Smalley | |
| 7,780,496 | B2 | 8/2010 | Liu | |
| 8,519,305 | B2 | 8/2013 | Nakajima | |
| 2008/0122335 | A1 | 5/2008 | Liu | |
| 2008/0190912 | A1 | 8/2008 | Yeung | |
| 2009/0314765 | A1 | 12/2009 | Feng et al. | |
| 2010/0075024 | A1 * | 3/2010 | Ajayan | C08K 7/24 |
| | | | | 427/66 |
| 2013/0153559 | A1 * | 6/2013 | Choi | H05B 3/84 |
| | | | | 219/203 |
| 2014/0069699 | A1 * | 3/2014 | Feng | H05K 1/09 |
| | | | | 174/257 |
| 2014/0070054 | A1 | 3/2014 | Burton et al. | |
| 2014/0124495 | A1 * | 5/2014 | Feng | H05B 3/86 |
| | | | | 219/203 |

OTHER PUBLICATIONS

NASA Technical Memorandum 4787 "Thermal Conductivity Database of Various Structural C—C Composite Materials," 1997.
Extended European Search Report from EP Application No. 16000007.1 dated Oct. 10, 2016.

* cited by examiner

UNIFORM HEAT DISTRIBUTION IN RESISTIVE HEATERS FOR ANTI-ICING AND DE-ICING

RELATED APPLICATIONS

This application claims priority to U.S. Provisional Patent Application Ser. No. 62/100,440 filed 6 Jan. 2015.

INTRODUCTION

Flight in icing conditions poses potential problems to aircraft. Ice accumulation on critical surfaces can change the aerodynamic performance of the aircraft, altering flight capabilities. Ice can also accumulate and then detach, where it may be ingested by the engine or cause other damage to the aircraft. Icing conditions may be defined by the rate of accumulation of ice, dependent on environmental conditions such as temperature and liquid water content, flight conditions such as speed and altitude, and airfoil shape. Ice protection systems are used to enable flight in light to moderate icing conditions. A representative accretion rate for reference purposes is 0.25 to 1 inch per hour and 1 to 3 inches per hour for light and moderate icing, respectively. Generally, light conditions have a liquid water content of 0.125 to 0.25 $g/m^3$ and moderate conditions have a liquid water content of 0.25 to 0.60 $g/m^3$.

Electro-thermal ice protection systems use resistive heaters to prevent ice from forming on critical surfaces such as engine inlets, rotor blades, wings, or other control surfaces. Electrical power is supplied to a conductive heating element that is placed near the surfaces requiring ice protection. U.S. Pat. No. 5,925,275 describes the use of an electrically conductive composite heater, in which a metallized fabric is embedded into a composite aircraft structure and serves as heating element. The heating element is connected to a copper bus bar using a silver-filled adhesive. These embedded heaters are satisfactory for providing targeted and robust ice protection for critical surfaces. However, they require integration with the structural composite and cannot be retrofitted to existing aircraft. Furthermore, the location of the heaters far below the surface, into a thermally conductive medium, means that they require substantial power to anti-ice/de-ice in light conditions below 0° F. or moderate icing conditions.

US 20090314765 describes the use of a carbon nanotube (CNT) coating as a heating element that is applied to the outside surface of an object and protected with a topcoat. This configuration is better for retrofitting and minimizing power. However it does not address the interface between the heating element and the electrodes.

Burton et al. in US 2014/0070054 describe CNT-based resistive heaters for the deicing of airfoil surfaces including a multi-panel structure such as that shown in FIG. 1. FIG. 1 shows a schematic 100 of a cross-section of an aircraft wing 112, central heater 122 at the stagnation zone, lower heaters 114 and 116, upper heaters 118 and 120, ice layer 126, and aerodynamic streamlines 124. In operation, central heaters along the stagnation line or zone would be generally heated continuously, but alternatively may be heated intermittently. Typically, any gap between panels would be filled by an insulating material preferably the same polymer that overlies the CNTs.

For an in-flight anti-ice/deicing system to function properly, it must maintain uniform application of heat along the aircraft surface. The presence of hot spots in the heater, for example created by contact resistance at the electrode-heater interface, will cause these regions to overheat during powering. At higher power densities, such as needed for icing conditions at temperature below 0° F. and airspeeds of about 150 to 180 knots or high liquid water content, these hot regions can cause degradation of the material, leading to failure of the system, or potential loss of structural integrity of the aircraft. The maximum operating temperature of some carbon fiber aircraft is below 145° F. Any areas that are colder than the desired temperature serve as initiation points where ice will accrete and can be difficult or impossible to remove at a later time. Furthermore, non-uniformities in the geometry, such as sharp ridges or defects on the surface, can serve as initiation points.

For large surfaces, it is useful to employ an array of individual heater cells and use a zoned heating approach. Each heater is controlled individually—for example, some operating in anti-icing mode near the airfoil's leading edge and others operating in de-icing mode at the airfoil's lower and upper surfaces to remove runback ice.

Employing this multi-zone heater approach allows the wing area aft of the leading edge to be kept clean of ice with having heaters only installed in the leading edge section of the wing. By applying the proper amount of heat to the stagnation point in an anti-icing mode, the re-freeze location is contained to the area above the deactivated leading edge deicing heaters. Upon activation of the deicing heaters the ice is shed in large sheets by aerodynamic forces. Only the ice directly in contact with the aircraft surface is melted. This increases shedding rates while conserving power by decreasing the total mass of ice that must be melted.

The multi-zone heater approach also prevents runback ice, defined as ice that re-freezes aft of the leading edge after traveling along the wing chord length in a wet-running condition. Runback ice increases aerodynamic drag and therefore must be prevented. The heater array configuration also provides inherent damage tolerance. In the event that an individual heater is damaged, the remaining heaters are unaffected and will operate normally. Therefore overall system robustness with regards to ice protection is maintained.

The zoned heaters may be created by assembling multiple heaters and placing them parallel to one another along the aircraft surface. However, a challenge with this approach is the presence of gaps between heaters (for example, the gap between heaters 114 and 116 in FIG. 1). The gap between heaters can serve as a point for ice initiation. The gap is a cold region due to the lack of resistive heat in those regions. In addition, the position where one heater joins the next is a geometric defect in the surface. The surface can be smoothed by adding filler over the heaters and sanding; however, the presence of insulating filler over the surface reduces the heat output. As a result, higher operating powers are required to get the same level of anti-icing or de-icing performance. Furthermore, non-uniform application of filler also leads to formation of thermal non-uniformities in the system.

SUMMARY OF THE INVENTION

In a first aspect, the invention provides a lightweight and compact carbon-based heating device disposed on a substrate, comprising: two electrodes, each of which is bonded to the substrate by an adhesive; wherein the edge of the electrode closest to the substrate is defined as the bottom of the electrode and the edge furthest from the substrate is defined as the top of the electrode and wherein the edges of the electrode between the top and bottom are defined as the sides of the electrode; a conductive polymer bonded to at least one side of each electrode, wherein the conductive polymer is thickest near the bottom of each electrode and thinnest near the top of each electrode so as to form a sloped surface of the conductive polymer on the sides of each electrode; and a conductive CNT heater layer disposed between the sloped sides of the conductive polymer.

In some preferred embodiments, the sloped surface as measured from the bottom to the top of the electrode has an angle of between 10 and 80 degrees, or between 30 and 60 degrees from horizontal. In addition, there may be a heat-spreading layer disposed above or below the conductive CNT film. In some embodiments, the conductive polymer comprises silver dispersed in a polymer. In some preferred embodiments, the electrodes have a rectangular cross-section in the direction perpendicular to length and wherein the sides of the electrodes that face each other are encapsulated by the conductive polymer. The electrodes can be disposed on a substrate and the electrodes are encapsulated by the conductive polymer except for the sides of the electrodes facing the substrate.

The adhesive is a preferably a structural adhesive which bonds components and bears loads and that will result in securely attached electrical leads after exposure to conditions typical for an airfoil surface. Suitable structural adhesives are generally recognized by skilled design engineers. The adhesive can be, for example, selected from the group consisting of: epoxies, acrylics, urethanes, vinyl acetates and combinations thereof. The structural adhesives are typically nonconductive.

The conductive polymer is preferably a polymer (that may itself be nonconductive) filled with a metal; more preferably a polymer containing metal particles comprising Ag, Cu, or Au. The conductive polymer may alternatively, or in addition, comprise carbon, preferably graphite or nickel-coated carbon. The polymer can be any polymer that has sufficient thermal stability for the application (i.e. it should not degrade during heater use). Epoxies are preferred polymers.

In another aspect, the invention provides a carbon-based heating device or intermediate heating device, comprising: a planar array of CNT heater cells disposed in a layer; and polymer-filled joints disposed between the CNT heater cells; wherein the joints have a roughness of no more than 50 µm, preferably no more than 30 µm, and still more preferably no more than 10 µm, and in some embodiments, in the range of 5 µm to no more than 50 µm (the level of "roughness" means that optical profilometry does not show any steps of greater than 50 µm (or 3 µm or 10 µm)over a linear (horizontal) distance of 10 µm or less over the planar array.

In the examples, a Nanovea optical profilometer was used to measure roughness; however, other commercial devices could alternatively be employed.

Each CNT heater cell comprises a CNT heater film and two electrodes. The polymer-filled joints are preferably polyurethane, but may comprise any electrically insulating polymer.

An intermediate heating device is not a finished device but is a device that is subjected to additional manufacturing steps to provide a finished device. For example, an intermediate can be coated with a protective surface layer.

It is contemplated that any of the features described herein can be combined with other features of the invention. For example, it is contemplated that the inventive aspect of a smooth surface over the joints may be combined with any combination of the features of the first aspect.

In a further aspect, the invention provides a carbon-based heating device, comprising: a planar array of CNT heater cells disposed in a layer; polymer-filled joints disposed between the CNT heater cells; and a heat-spreading layer that is integral to and adjacent to the single sheet; wherein the heat-spreading layer has a thermal conductivity of at least 10 W/mK, or at least 15 W/mK, or in the range of 10 to 100 W/mK. The electrical conductivity of the heat spreading layer should be lower than that of the CNT heater layer, and the resistances should be selected so that current flows from the electrodes through the CNT layer and not through the heat spreading layer. In some cases, to promote adhesion and stability, it is useful to separate the CNT layer from the heat spreading layer with a thin epoxy primer layer.

The thermal conductivity can be measured by methods known in the art for measuring thermal conductivity of conductive materials. See NASA Technical Memorandum 4787 "Thermal Conductivity Database of Various Structural C-C Composite Materials," 1997, see p.2 under the Experimental Procedures (this paper uses flash thermography to measures thermal diffusivity through samples that are less than 0.3 in thick) and the references cited therein, including Parker et al., "Flash Method of Determining Thermal Diffusivity," J. Appl. Phys. pp 1679-84 (1961).

The heat-spreading layer comprises a polymer and such materials are commercially available. For example, 3M sells a line of acrylic adhesive heat spreading tape (series 9876). The heat spreading layer may comprise a polymer, such as an epoxide or polyurethane, filled with a thermally conductive filler such as graphene (electrically conductive) or boron nitride (electrically insulating). Alternatively, a fibrous nonwoven veil made of carbon fiber or nickel coated carbon fiber may be applied to a CNT heater layer that has been primed with epoxy. Such veils may be applied and finished using methods known in the art.

In another aspect, the invention provides a carbon-based heating device or intermediate heating device, comprising: a planar array of CNT heater cells disposed in a layer; wherein each CNT heater cell comprises two electrical leads and a CNT heater layer disposed between the leads; at least one polymeric layer disposed over the layer; and the at least one polymeric layer having a surface having a surface area of at least 5 cm×5 cm that extends over the planar array, the surface having a thermal uniformity characterizable by test conditions wherein the device is powered to 0.5 W/6.5 cm$^2$ (or 2 W/in$^2$) for 120 s, wherein an area of at least 5 cm×5 cm on the surface increases in temperature by at least 10 C and there is no 1 cm×1 cm square within the 5 cm×5 cm area that has a temperature greater than 5 C (preferably 3, more preferably 1, still more preferably no more than 0.5 C) than the average temperature of the 5 cm×5 cm square. Surface temperature is measured by an infrared temperature sensor. In this context, "surface area" means the geometric area (as contrasted to microscopic surface area measured by a technique such as the BET method or the like). The heat-spreading layer is a layer of a single composition or a single composition plus a primer layer.

In some preferred embodiments, the device is characterized by its thermal uniformity over the surface of the entire device. In some preferred embodiments, the device has a thermal uniformity characterizable by test conditions wherein the device is powered to 0.5 W/6.5 cm2 (or 2 W/in$^2$) for 120 s wherein the temperature differential identifiable by infrared temperature profiling at any location within the 5 cm×5 cm square is no more than 5 C (preferably 3, more preferably 1, still more preferably no more than 0.5 C) than the average temperature of the 5 cm×5 cm square. Any of these characteristics can be combined with any of the other aspects of the invention.

In a further aspect, the invention provides a carbon-based heating device or intermediate heating device, comprising: a planar array of CNT heater cells disposed in a layer; wherein each CNT heater cell comprises a CNT heater film and two electrodes; and polymer-filled joints disposed between the CNT heater cells; wherein the contact resistance of a heater cell is 30% or less (20% or less, or in the range of 15 to 30%, or 15 to 20% or 15 to 18%).

Contact resistance is measured as follows: If the heater film is coated, then the coating(s) is removed. The resistance of the heater is measured by a 4-point probe which provides the sheet resistance of the material (Rs) in Ω/sq, in the absence of contact resistance. The resistance at the two electrodes is then measured using an ohmmeter. This measurement gives the resistance in Ω. This value can be converted to sheet resistance (Ω/sq) by multiplying by the distance between electrodes (inside edge) and dividing by the width of the heater (the length of a heater (or heater cell) is in the direction of the distance between electrodes and, obviously, perpendicular to length; with thickness being perpendicular to length and width. This provides the sheet resistance with contact resistance (Rs,c). The percentage for contact resistance is (Rs,c-Rs)/Rs. The electrodes are typically narrow As with all other characteristics mentioned herein, the contact resistance characteristic may be combined with any of the other inventive aspects.

In some aspects, the invention provides an electrothermal ice protection system for anti-icing/deicing in icing conditions below 0° F. while minimizing power. The system is capable of preventing internal temperature or localized hot spots above 145° F. during use. For example, this configuration enables successful anti-icing and deicing in light and moderate icing conditions at −4° F. and −22° F. using a power of 12.5 W/in$^2$ or less.

In some preferred aspects, the invention provides a thin film heater applied just underneath a topcoat, preferably the thin film heater is less than 500 μm beneath the outside surface (i.e., the interface with the atmosphere) and more preferably 200 μm beneath the outside surface—efficiently directing all heat to the surface. Typically, the thin film heater employs a hybrid electrode interface, using a metal foil or metal braid that is attached to the aircraft surface with a structural adhesive and has been smoothed along the edges with metal-filled adhesive—reducing contact resistance with the CNTs and ensuring uniform heat distribution, while exhibiting corrosion resistance.

In some preferred aspects, the invention provides an array of heater cells created as a single sheet—providing a low roughness at joints between heaters, such that the roughness is less than 50 μm.

Using a heat spreading material, provided underneath or overtop of the heaters—improving the thermal uniformity of the system and warming the gap between heaters. The preferred heat spreading material has an in-plane thermal conductivity value of at least 10 W/mK and more preferably 20 W/mK.

An advantage of the present method is that it allows the placement of heaters on top of the substrate, where the anti-icing or de-icing function is needed. A further advantage is that these heaters can be placed on the substrate at room temperature using standard coating approaches; this enables coating of temperature sensitive substrates and allows retrofitting of the heaters onto existing aircraft. The heaters may be coated with one or more durable coatings, such as MILSPEC 85285 polyurethane coating or rain erosion tape. These additional coatings preferably add 500 μm or less additional thickness over the coating, preferably no more than 100 μm additional thickness.

Glossary of Terms

The term "carbon nanotube" or "CNT" includes single, double and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000.

The term "device" refers to the heater cells and layers over the heater cells, and extends for a distance of 1 cm around the circumference (that is, extending around the edges of the heater cells) in the plane of the heater cells and parallel to the substrate. Thus, the "device" does not mean an entire wing but only the portion of the exterior where heater cells are present.

The term "planar array" refers to a plurality (at least 2, preferably at least 3, or at least 10, or 2 to 100) of heater cells that share the same layer. The term "planar" is not strictly limited in the geometrical sense but also includes a layer that conforms to the surface of an airfoil.

The invention is often characterized by the term "comprising" which means "including." The invention may alternatively be characterized by the more restrictive terms "consisting essentially of" or "consisting of."

DETAILED DESCRIPTION OF THE INVENTION

Figure 1:
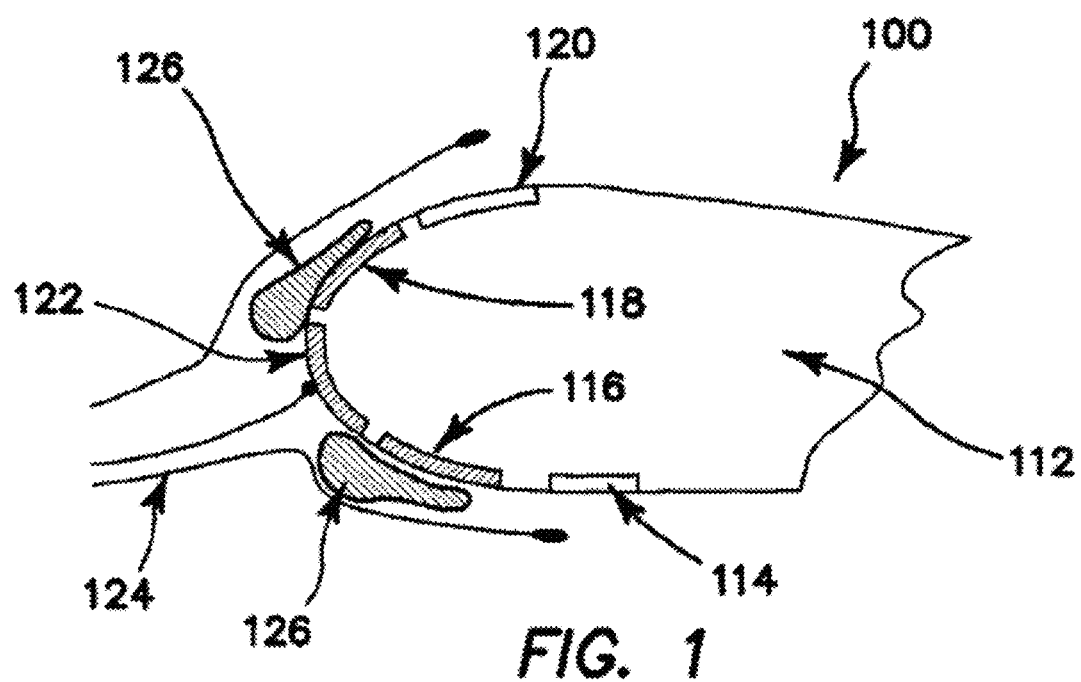
FIG. 1 schematically illustrates a cross-sectional view of heaters on an aircraft wing.

In this invention, the heating element is based on a carbon nanotube (CNT) film. An aqueous paint made of CNTs and high molecular weight polymeric dispersing agent can be applied to the target substrate at room temperature. Such carbon nanomaterial dispersions and methods of depositing them onto substrates are known in the art. The target substrate may be a primed aircraft surface—where a primed aircraft surface is defined as one that has been painted with an insulating primer layer such as described by MILSPEC PRF85582. The paint is dried to provide a conductive heating element, the electrical sheet resistance of which is determined by the thickness of the film. The thickness is generally in the range of 1 to 10 µm, depending on the desired heater power. The heater power is determined using the available voltage by the relationship V2/R, where R is a function of the sheet resistance and the geometric layout with the electrodes. In other words, the power for a heater in which the resistance at the leads is 20 Ω and the applied voltage is 100 V is 500 W. A heater with a 20 Ω resistance can be prepared several ways. For example—by using a material with 1 Ω/square sheet resistance and using 1 cm leads spaced 20 cm apart or by using a material with a 10 Ω/square sheet resistance and using 1 cm leads spaced 2 cm apart. If we consider a surface such as an aircraft wing, it may be desirable to cover a section of the wing with multiple 500 W heaters. The weight of this system will be largely dependent on the weight of the electrical leads, connectors, and wiring.

Since the leads, connectors, and wiring are the main contributor to the weight of the system, it is desirable to minimize the number of electrical leads by using a material with low sheet resistance—less than 7 Ω/square after fully prepared and topcoated—to maximize the distance between leads. The use of CNT coatings enables this invention, and the aspect ratio for lead spacing to lead length of heaters in this invention is greater than 1, more preferably greater than 5 or greater than 10 and, in some embodiments up to 100. A large spacing between electrical leads is desirable, as the leads, connectors, and wiring are the main contributor to the weight of the system.

"After topcoating" refers to the fact that the heating element is subsequently coated with additional coating layers, such as primers and topcoats per MILSPEC PRF 85285, to provide durability. Many conductive elements, such as carbon fiber veils, become substantially less conductive once filled, owing to the fact that the open spaces and junctions have been filled with insulator.

An important aspect of the present invention is the method by which the electrodes are connected with the heating element. We found that many methods known in the art for creating leads, such as the use of silver filled epoxy, resulted in the formation of hot spots along the lead interface. Furthermore, they do not provide sufficient flexibility in changing the lead gauge to accommodate different currents. Electrodes that are not sized properly for the current load will act as resistive heaters themselves. Vapor deposited metal requires the use of vacuum and is not appropriate for retrofitting leads onto existing aircraft.

Metal foil and metal braids are commonly used in the industry as bus bars. A contact can be made by attaching the Cu lead to the substrate using an adhesive. However, the sharp interface made between the metal and the CNT heating element creates hot spots during powering. Furthermore, the epoxy tends to spread onto portions of the lead, creating a non-uniform contact.

We have found that the above-mentioned problems can be ameliorated by using a hybrid contact. A hybrid contact is defined as a contact composed of multiple functional materials. For example, an electrode material, a structural adhesive, and an electrical interface materials. The electrical interface material connects the electrode and the CNTs—it is a transition material that is a conductive adhesive, such as silver epoxy. The silver epoxy serves to soften the sharp interface between the thin CNT heating element (approximately 0.5 µm to 10 µm thick) and the relatively tall metal lead (up to 150 µm thick). It may also serve as a structural adhesive. It further serves to prevent corrosion of the Cu leads.

A preferred lead is a metal foil or braid conductor that can be selected based on engineering guidelines for the current load, to prevent heating at the environmental conditions. A preferred material is Cu having a thickness of 0.005 inch (120 µm) or less and width that is less than 0.1 inch. The lead can be attached to the substrate using a structural adhesive. Preferred adhesives are thixotropic, to prevent wicking onto the lead, and selected so that curing temperature is compatible with substrates. The preferred adhesive is an epoxy with a high thermal stability and Tg greater than 45° C. Examples include Loctite EA9395, DP460, and DP420. Conductive adhesives may also be used, provided they have good adhesive bonding between the Cu and the substrate.

Once the structural adhesive (preferably an epoxy) is cured, the electrical interface material is created by feathering a conductive adhesive along the outer edges of the Cu lead. By feathering, it is meant that the material forms a smooth slope from the tall Cu lead to the substrate. Smooth is defined as a transition that does not have substantial square edges, mask lines, jagged edges, or irregularities. Investigation under a microscope would show that the entire contact line along the lead interface is tapered from the highest edge of the lead to the substrate. Smoothing may also be accomplished by lightly sanding the edge.

Appropriate conductive adhesives have resistivity less than 0.01 Ω·cm. Preferred adhesives have Tg higher than 45° C. and may be cured below 65° C.

Figure 2:
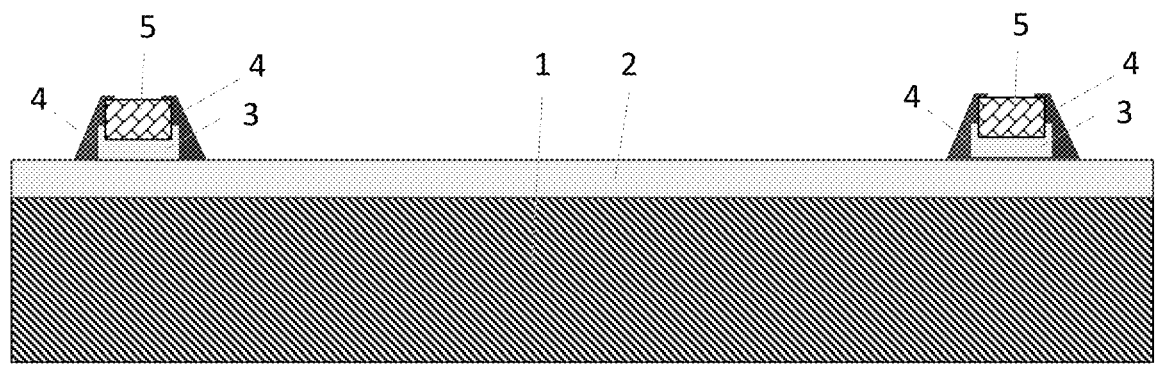
FIG. 2 illustrates an exaggerated configuration of hybrid interface (not to scale): 1=substrate; 2=primer; 3=structural adhesive; 4=interface material; 5=lead. The heater element is applied between the two hybrid leads.
Figure 4:
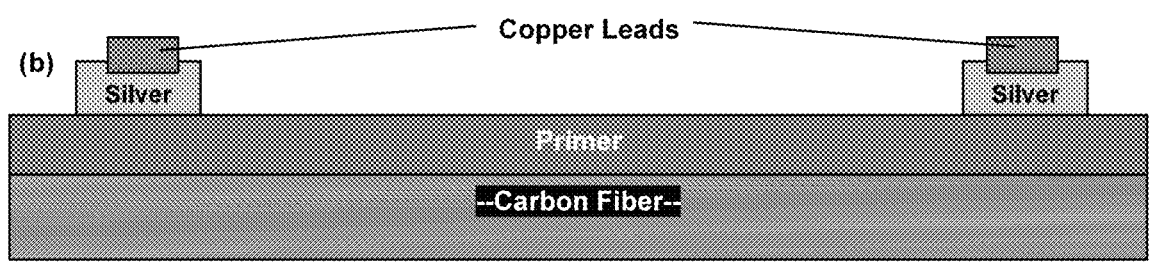
FIG. 4 schematically illustrates the configuration of Example 19.
Figure 5:
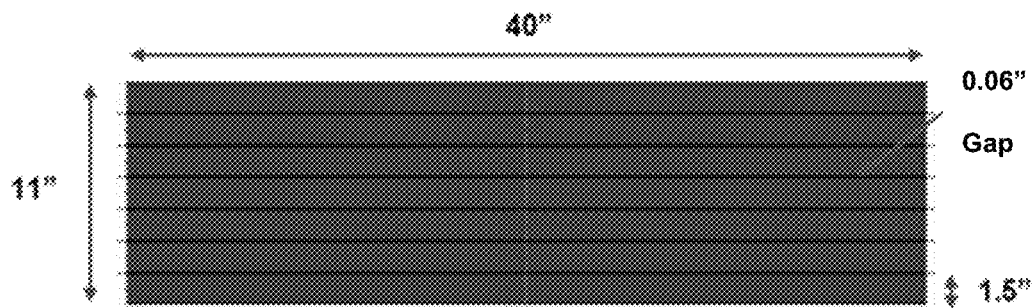
FIG. 5 illustrates 14 heater cells applied to a heat spreading substrate.

This conductive adhesive creates a uniform, soft interface with the CNT heater element. Soft refers to the fact that these adhesives can furthermore act as cushion for the mismatch in coefficient of thermal expansion of the components. U.S. Pat. No. 5,925,275 describes the use of silver adhesive to connect a Cu lead to a Ni-coated carbon fiber heating element and describes that the silver adhesive between the lead and the heating element prevent corrosion. We found that for our thin film systems (Cu leads are preferably less than 75 µm beneath the surface), it is insufficient to use Ag adhesive at the lead-heater interface. However, we found that complete encapsulation of the Cu lead edges provides a material that is corrosion resistant. The hybrid interfaces may then be coated with CNT paint. FIG. 2 illustrates an exaggerated configuration of hybrid interface (not to scale): 1=substrate; 2=primer; 3=structural adhesive; 4=interface material; 5=lead. The heater element is applied between the two hybrid leads.

CNT heating layers of the present invention preferably contain at least 25 weight % CNT, in some embodiments at least 50 wt %, and in some embodiments 25 to 100 wt % CNT. The CNTs can be distinguished from other carbonaceous impurities using methods known to those skilled in the art, including NIR spectroscopy ("Purity Evaluation of As-Prepared Single-Walled Carbon Nanotube Soot by Use of Solution-Phase Near-IR Spectroscopy," M. E. Itkis, D. E. Perea, S. Niyogi, S. M. Rickard, M. A. Hamon, H. Hu, B. Zhao, and R. C. Haddon, Nano Lett. 2003, 3(3), 309) Raman, thermogravimetric analysis, or electron microscopy (Measurement Issues in Single Wall Carbon Nanotubes. NIST Special Publication 960-19). The CNT heating layer (prior to additional coating) may be dispersed in a polymer or may contain little or no polymer ("polymer" does not include CNTs or carbonaceous materials that typically accompany CNTs—typical examples of polymers include polyurethane, polycarbonate, polyethylene, etc.); preferably the CNT heating layer comprises less than 25 wt % polymer, more preferably less than 10 wt %. The volume fraction in the network layer is preferably at least 20% CNTs, more preferably at least 50%, and in some embodiments 2 to about 90%. The remainder of the composite may comprise air (by volume) and/or other materials such as residual surfactant, carbonaceous materials, or dispersing agent (by weight and/or volume).

After the CNT heater layer has been overcoated, it retains electrical conductivity provided by contacts between CNTs. In some embodiments, a CNT heater layer that has an overlying polymer coating comprises 50 mass % or less of the coating polymer within the CNT layer, more preferably 25 mass % or less, and still more preferably 10 mass % or less of the coating polymer within the layer. Preferably, a CNT layer comprises at least 25 mass % CNTs and carbonaceous materials, and preferably at least 50 mass % CNTs and in some embodiments 30 to 100 mass % CNTs. CNT networks and CNT fibers have very distinct rope-like morphology as observed by high resolution SEM or TEM. See for example Hu, L.; Hecht, D. S.; and Gruner, G. *Nano Lett.*, 4 (12), 2513-2517 for CNT networks and U.S. Pat. No. 6,683,783 for images of CNT fibers. In some preferred embodiments, the overcoating composition contacts the surface of the CNT network layer but does not fill spaces within the network layer. Penetration of a coating into the CNT layer could also be determined by cross section of the multi-layer sample and then analysis by methods such as SEM-EDS or XPS; the CNT layer is preferably substantially free from N-groups that are associated with the topcoat.

CNT layers have many contacts between CNTs and good conductivity that is, a resistivity less than 0.05 Ω·cm, preferably less than 0.002 Ω·cm. The sheet resistance of this layer should be less than 500 Ω/square, preferably less than 200 Ω/square, more preferably less than 50 Ω/square. The sheet resistance can be measured by 4-point probe by making contact with the CNT layer. However, from the standpoint of heater functionality, the important measure must also include any contributions from electrode-heater contact resistance and penetration of the topcoat into the heater. The resistance at the electrodes can be converted into sheet resistance. The sheet resistance at the electrodes is preferably less than 50 Ω/square and more preferably less than 10 Ω/square. The CNT layer may be planar, cylindrical, or other contiguous geometry; in some preferred embodiments, the CNT layer is substantially planar (similar to a sheet of paper or a nonwoven textile sheet, a few fibers may project from a planar layer). These are preferred characteristics of the CNT layer both before and after a coating is applied over the CNT layer.

A CNT heater layer in this invention can be prepared as a dispersion of CNTs applied directly to a substrate where the solvents used in the dispersion process are evaporated off leaving a layer of CNTs that coagulate together into a continuous network. The CNT heater layer may be prepared from dispersions and applied by coating methods known in the art, such as, but not limited to, spraying (air assisted airless, airless or air), roll-coating, gravure printing, flexography, brush applied and spin-coating. In some embodiments, the thickness of the CNT layer is in the range from 0.005 µm to 100 µm, preferably in the range of 0.05 µm to 100 µm, more preferably in the range of 0.3 µm to 100 µm.

The CNT layer may include other optional additives such as p-dopants. P-dopants could include, but are not limited to, perfluorosulfonic acids, thionyl chloride, organic pi-acids, nitrobenzene, organometallic Lewis acids, organic Lewis acids, or Bronsted acids. Materials that function as both dispersing agents and dopants such as Nafion and hyaluronic acid may be present. These materials contain p-doping moieties, i.e. electron accepting groups, within their structure, often as pendant groups on a backbone. Generally, these additives will be present as less than 70% by weight of the CNT film, and in some embodiments as less than 50% by weight of the CNT film. Polymers and carbohydrates that function as both dispersing agents and dopants can be distinguished from other polymer materials, i.e. those functioning as only a dispersing agent or those functioning as a structural component. Because of the presence of electron accepting moieties, these materials can form a charge transfer complex with semiconducting CNTs, which p-dopes the semiconducting CNTs and raises the electrical conductivity. Thus, these dual dispersing agent/dopants can be tolerated at a higher mass percentage within the CNT layer than other types of polymer materials or surfactants. A CNT layer may be stabilized to moisture fluctuations by using dispersing agents and post treatment to provide a CNT composite, comprising: a solid dispersion comprising CNTs and a glycosaminoglycan or polysaccharide; wherein the dispersion comprises at least 20 wt % of the glycosaminoglycan or polysaccharide; wherein the sum of Na, K, Mg, and Ca associated with the glycosaminoglycan or polysaccharide is less than 1 wt % of the dispersion.

The CNT heater layer can be overcoated with a solvent-based polymeric coating or a solventless coating composition. A solventless coating composition comprises reactive components that react to form a solid coating; preferably a solventless coating composition comprises a polyol and an isocynate. The polyol component of the present invention contains both (i) functionality capable of reacting with isocyanate groups ("isocyanate-reactive") and (ii) 100% solids content (free from any organic or water solvent). The expression "isocyanate-reactive" functionality as used herein refers to the presence of functional groups that are reactive with isocyanate groups under conditions suitable for cured coating formation. Such isocyanate-reactive functionality is generally known to those skilled in the coatings are and includes, most commonly, active hydrogen-containing functionality such as hydroxyl and amino groups. Hydroxyl functionality is typically utilized as the isocyanate-reactive functionality in coatings and is essentially suitable for use in the present invention. In some embodiments, the polyol is a polyester polymer having isocyanate-reactive functionality incorporated into the polymer via appropriate monomer selection. Examples of monomers that may be utilized to synthesis the polyester polyol include carboxyl group-containing ethylenically unsaturated monomers and hydroxyl group-containing ethylenically unsaturated monomers.

In some embodiments, solventless, preferably 100% solids, (free of organic and water solvent) suitable isocyanate compound or mixture of compounds can be used as the curing agent to form a protective layer over a CNT heater layer. To function as an effective crosslinking agent, the isocyanate should have at least two reactive isocyanate groups. Suitable polyisocyanate crosslinking agents may contain aliphatically, cycloaliphatically, araliphatically and/or aromatically bound isocyanate groups. Mixtures of polyisocyanates are also suitable. Polyisocyanate containing aliphatically, cycloaliphatically, araliphatically and/or aromatically bound polyisocyanate groups are also suitable. This includes, for example: hexamethylene trimethylhexamethylene diisocycante, meta-α,α,α',α'-tetramethylxylylene-diisocyanate, 1-isocyanato-3,3,5-trimethyl-5-isocyanatom-ethyl cyclohexane (isophoronoe diisocyanate or "IPDI"), bis(4-isocyanatocyclohexyl)methane (hydrogenate MDI), toluene diisocyanate ("TDI"), hexamethylene diisocyanate ("HDI") or biuret derivatives of various diisocyanates. For example, a 100% solids epoxy coating system may be applied via spray or drawdown. Another example may be to place a thin, chemically resistant polymer film, such as polyurethane thermoplastic, onto the top surface of the CNT layer followed by thermal treatment to form a seal (thermoforming). Thermoforming would provide an intimate contact with the CNT layer and provide adequate protection to maintain its integrity from solvents in a topcoat layer.

In any polymer-containing layer, other additives can also be incorporated such as cure catalysts. Cure catalysts for isocyanate are well known to those skilled in the art such as organometallic catalysts and, particularly, organotin compounds such as dibutyltin diacetate, dibutyltin dioxide, bibutyltin dilaurate and the like. Other optional ingredients such as surfactants, defoamers, thixotropic agents, antigassing agents, flow control agents, pigments, fillers, and other additives without added organic or water solvents may be included in the composition.

The thickness of a protective coating composition over the CNT heater layer is preferably 2 mm or less, more preferably 150 µm or less, preferably 50 µm or less, in some embodiments, a thickness of 250 nm to 50 µm.

A coating composition can be applied over the CNT heating layer(s) by known methods; for example, bar coating or spraying. After application of a protective coating to the CNT layer, the coated substrate can be cured (in some embodiments, curing is conducted at ambient temperature). In the curing operation, the film forming materials crosslink to leave a mechanically durable and chemically resistant film.

The sheet resistance of the CNT layer before coating may be determined by standard 4-point probe methods or other known methods for determining sheet resistance.

The methods disclosed in this invention may be used to create heater arrays. In order to prevent the formation of cold zones or other geometric nucleating sites in the joint between heaters, the heating elements are sprayed as a single sheet and/or combined with a heat spreading layer, which may be underneath or over the CNT heater layer. For materials underneath the CNT heater layer, it is preferable that the thermal conductivity is anisotropic and that the through-the-thickness thermal conductivity be an order of magnitude lower. In some embodiments, the heat can be spread the substrate itself, either with or without a heat-spreading layer. A suitable heat spreading material as an underlayer is T-300 carbon fiber epoxy composite.

An appropriate heat spreading material can be selected for a desired gap spacing. When an underlayer having 10 W/mK is employed as the heat spreading substrate and the heater array is composed of multiple 360 W heaters having a gap spacing of 0.0625 inches, anti-icing and de-icing performance can be achieved at −4° F. and −22° F., 154 knots (kts), liquid water content of 0.36 g/m3 and water droplet size of 25 µm.

For materials applied over the heater, the thermal conductivity may be isotropic or even having a through-the-thickness thermal conductivity that is higher than the CNT heater layer. This allows the heat to move to the anti-icing/de-icing surface. Examples of suitable heat spreading materials include carbon nanotube network coatings, carbon nanotube composite coatings, carbon fiber veil, metal coated carbons or carbon fiber veil, graphene coatings, boron nitride filled polymers or other filled polymers. The composition of the heat-spreading layer(s) is different (in materials and/or material concentrations) from that of the CNT heater layer(s); typically, the heat spreading layer has a lower electrical conductivity than the CNT heater layer, preferably at least 10 times less electrically conductive.

Figure 3:
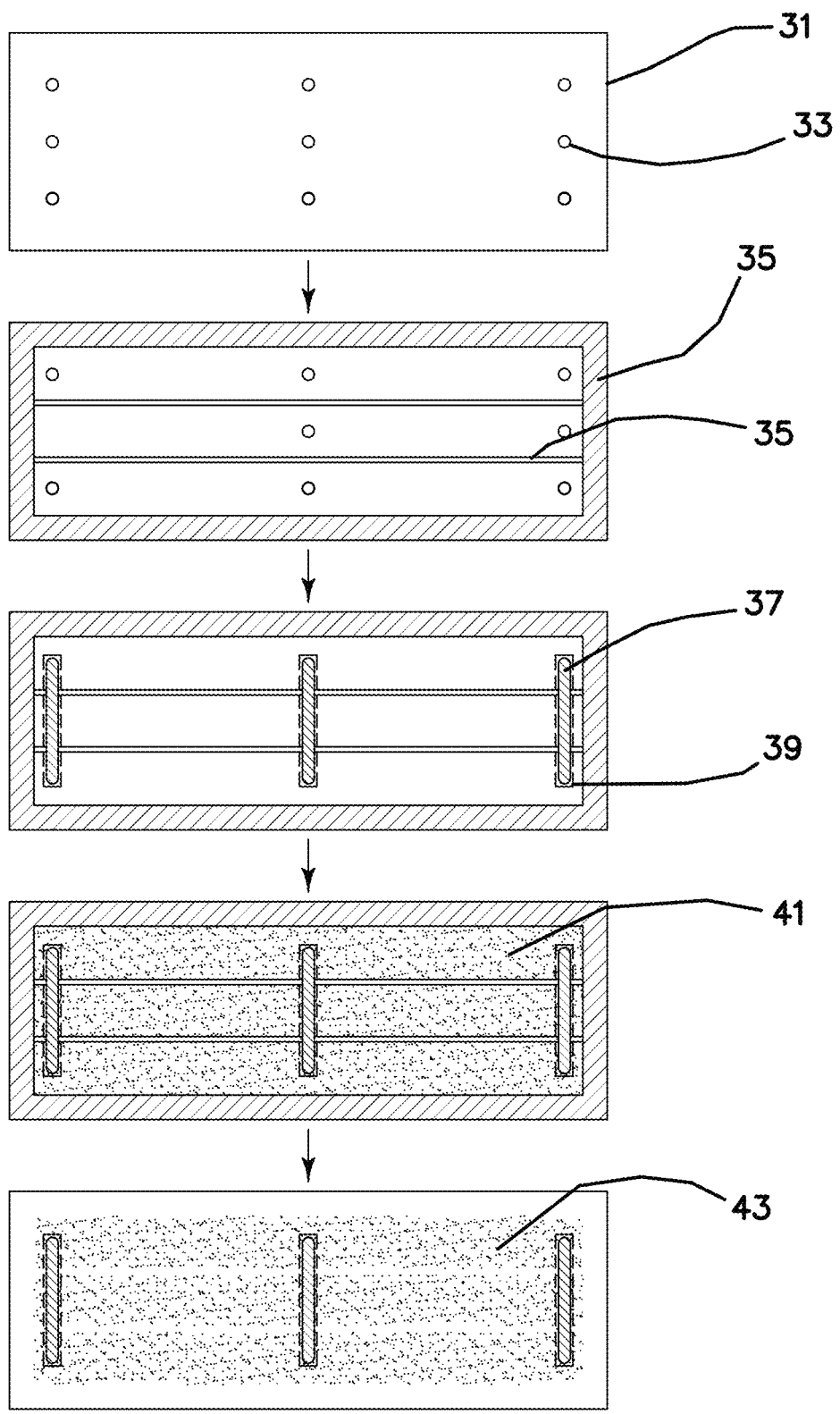
FIG. 3 schematically illustrates a method of applying heater elements.
Figure 6:
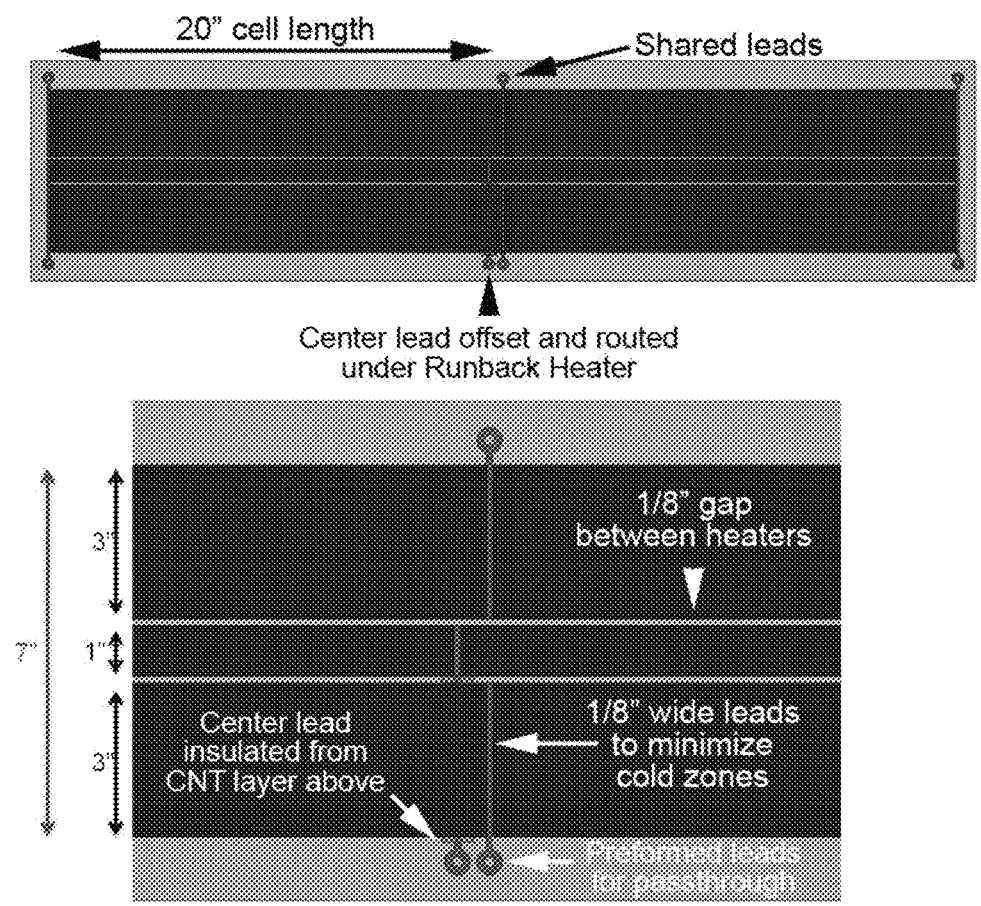
FIG. 6 shows the configuration used for Example 23. A six heater array was created on a single sheet. Electrical leads were run back to pass-through location.

FIG. 3 illustrates a method of making CNT heater layers. For testing purposes a plastic sheet (a surface) with perforations for leads is provided as the substrate. In actual application, this could be an airplane wing or other aircraft surface prepared with perforations for electrical leads. A mask is placed over the surface. Electrodes are attached to the surface with a structural adhesive. CNTs are sprayed over the entire surface. Then the mask is removed leaving heater cells that are separated by regions with little or no CNTs. Optionally, a heat spreading layer can be applied under and/or over the heater cells, when the mask is not present. The heat spreading layer may be applied over top of the heater array by fabricating the heater array, removing the mask, coating with a mist coat of solvent-based epoxy, and then by wrapping a fibrous non-woven veil over the array—heaters, gaps, and electrodes—and applying a thin layer of epoxy over top to finish. This layer may be lightly sanded and coated with a layer of topcoat to achieve a smooth, finished part.

The invention includes methods of manufacturing according to any of the methods described herein. For example, the invention includes a method of making a carbon-based heating device or intermediate heating device, comprising: providing a substrate comprising perforations for connections to a plurality of electrical leads disposed over the surface of the substrate and a plurality of electrical leads; applying a mask over the substrate; applying a CNT coating composition over the mask and over the substrate; and removing the mask. This method forms a plurality of heater cells with a CNT heater layer disposed between the electrical leads. The method may contain additional steps such as applying a heat-spreading layer either above or below the CNT heater layer. Preferably, the method includes a step of applying a conductive polymer onto the electrodes and a step of attaching the electrodes to the substrate with a structural adhesive. The CNT heater layer is planar (in the sense that it conforms to the surface of the substrate) and has gaps that separate the heater cells. Typically, a polymeric protective layer is applied over the plurality of heater cells.

The following examples illustrate some embodiments of the invention.

Experimental Methods

The difference in contact resistance between the lead and the heating element was determined by comparing two resistance readings—(1) the sheet resistance of the CNT film by 4-point probe and (2) the resistance at the electrodes. Since the sample is a square (1) and (2) should be the same if there is no contact resistance. The heating uniformity was determined by powering the samples, after coating with a polyurethane or other topcoat, in free convection at fixed voltage. The temperature of the sample area and along the contacts was determined by infrared imaging (FLIR). Selected samples were also placed in forced convection in an environmental chamber. The peel strength of the leads was determined using ASTM D3330. The resistance to corrosion was determined by salt fog exposure for 30 days according to ASTM B117.

EXAMPLES 1 TO 8

Heating Performance of Film Heaters on Steel

Steel panels that were 5 inch long and 3 inch wide were primed with Deft 44-GN-072, MIL-PRF-85582D low density epoxy primer, to 9-10 mil wet thickness and cured according to manufacturer's instructions. These panels were used as substrates for heater fabrication. Alternatively, plastic substrates that were 5 mil thick, 3.75 inch long and 2.75 inch wider were glued to the primed steel. All substrates were scuffed, solvent wiped, and Corona treated prior to lead attachment. One of two types of leads was attached to the substrate—either Cu foil (0.005 inch thick and 0.2 in wide) or Cu braid that had been pressed to 0.005 in thick and 0.2 in wide.

The leads were adhered to the substrate as follows. In all cases, two roughly 2.5 inch to 3 inch long leads were placed in parallel, spaced 2 inch apart. They were attached with adhesive, as described below. Results are shown in Table 1.

The adhesive was mixed and cured according to the manufacturer's specification. For some examples, a conductive interface material—Epotek EJ2189—was created by feathering the adhesive along the lead edge to the substrate. Next, a basecoat, consisting of polyurethane (Emery 200 polyol, dibutyltin dilaurate, and tolonate HDT-LV2) was used, masking the leads during application, demasking while still wet and carefully smoothing the mask line prior to curing. After cure, a layer of carbon nanotube network was applied to a masked area of 2 in by 2 in (5 cm×5 cm). The resistance was 1 Ω/square. After the mask was removed, the entire steel coupon was coated with polyurethane.

Devcon Epoxy Plus 25 is a two-part rubber-toughened, high viscosity (70,000 cP), structural adhesive. Hysol EA 9395 is a two-component epoxy with high viscosity (1000-2000 P), which cures at ambient temperature and has excellent strength properties at 350° F. Epotek EJ 2189 is a conductive, silver paste epoxy with high viscosity (55,000 to 90,000 cP) and resistivity of 0.009 Ω·cm. EPO-TEK 301 is a two component, room temperature curing epoxy featuring with low viscosity (100-200 cP).

The heating uniformity was evaluated by considering two parameters. The first is the temperature of the center of the heater at fixed power. When there are high contact resistances along the leads, this decreases the power into the sample, resulting in a lower center temperature. Thus, the center temperature can be used as a measure of the uniformity; lower temperatures indicate poorer heater uniformity. The second is the difference between the maximum temperature and the center temperature, reported as a percentage of the center temperature. Larger percentages indicate poorer heater uniformity.

Examples 1 and 8 show the case where the interface between the lead and the heater has a smooth transition created by an insulating epoxy. These heaters have high contact resistance.

Examples 2, 4, and 7 show the case where the amount of structural adhesive is carefully metered to prevent spreading of the adhesive past the leads. These samples have lower contact resistance than 1 and 8.

Examples 3, 5, and 6 show the case of using a conductive interface material. These samples have the best thermal uniformity, as evidenced by Tcenter and Tmax-Tcenter. Example 6 uses the silver adhesive as a structural adhesive.

TABLE 1

Description of Film Heaters on Steel

| Example | Substrate | Adhesive for Leads | Lead Type | Ag Adhesive; feather | $T_{center}$ at 1 W/in$^2$ (° F.) | $T_{center}$ at 2 W/in$^2$ (° F.) | $(T_{max} - T_{center})/T_{center}$ at 2 W/in$^2$ |
|---|---|---|---|---|---|---|---|
| 1 | None | Devcon Epoxy Plus; used a line that was wider than the lead, creating a border of 0.12 inch along the outside after cure | Cu Braid | None | 115.8 | 153.8 | 21.7 |
| 2 | Ultem | EA9395: Used a thin line to minimize excess spreading outside of lead | Cu Foil | None | 124.8 | 178.0 | 5.1% |
| 3 | Ultem | EA9395: Used a thin line to minimize excess spreading outside of lead | Cu Foil | Epotek EJ 2189 | 129.9 | 188.0 | 3.3% |
| 4 | Ultem | EA9395: Used a thin line to minimize excess spreading outside of lead | Cu Braid | None | 128.6 | 176.0 | 6.8% |
| 5 | Ultem | EA9395: Used a thin line to minimize excess spreading outside of lead | Cu Braid | Epotek EJ 2189 | 134.4 | 186.0 | 5.0% |
| 6 | Ultem | Epotek EJ 2189: Used a thin line to minimize excess spreading outside of lead | Cu Braid | Epotek EJ 2189 | 133.8 | 187.0 | 2.6% |
| 7 | Kapton | EA9395: Used a thin line to minimize excess spreading outside of lead | Cu Braid | None | 125.4 | 171.5 | 3.5% |

TABLE 1-continued

Description of Film Heaters on Steel

| Example | Substrate | Adhesive for Leads | Lead Type | Ag Adhesive; feather | $T_{center}$ at 1 W/in² (° F.) | $T_{center}$ at 2 W/in² (° F.) | $(T_{max} - T_{center})/T_{center}$ at 2 W/in² |
|---|---|---|---|---|---|---|---|
| 8 | Kapton | Epotek 301: # 12 drawdown bar and apply leads after 2.5 hours | Cu Braid | None | 126.6 | 170.5 | 11.8% |

TABLE 2

Description of Film Heaters on Ultem

| Example | Lead | Adhesive | [Tmax − Tcenter]/Tcenter at 1 W/in2 | [Tmax − Tcenter]/Tcenter at 2 W/in2 | Power at Failure (W/in2) |
|---|---|---|---|---|---|
| 9 | Cu Foil | DevconPlus Epoxy, wide border | 125% | failed (Tcenter = 125° F.) | 1.2 |
| 10 | Cu Foil | Carefully Metered EA9395 | | 22% (Tcenter = 193) | 2.2 |
| 11 | Cu Foil | Carefully Metered EA9395; Ag Adhesive Feather | | 10% (Tcenter = 197) | 2.9 |
| 12 | Cu Foil | solder | 233% | failed (Tcenter = 130° F.) | 1.4 |

EXAMPLES 13 TO 16

Heating Performance of Heaters on Carbon Fiber Airfoil

Heaters were prepared according to previous examples 1, 3, and 5 with the exception that the base substrate was a primed carbon fiber composite airfoil shape. The samples were placed in a benchtop wind tunnel capable of operating at windspeed of 91 mph that was in a controlled temperature and humidity chamber. As shown by comparing 13 and 15 with 14 and 20 (Table 3), the use of a hybrid interface decreased the contact resistance and improved the thermal uniformity. The power density that could be operated before overheating and failing was 22 W/in2 at 0 to 10° F. and 91 mph, as opposed to 16 W/in2 and 12 W/in2 for the comparative example.

TABLE 3

Description of Film Heaters on Primed Carbon Fiber Airfoil, Tested in Benchtop Wind Tunnel

| Example | Substrate | Lead Description | Contact Resistance | Power Density at Failure (W/in2) |
|---|---|---|---|---|
| 13 | Ultem attached to primed carbon fiber airfoil | Cu foil attached with Devcon Epoxy Plus having wide border | 100% | 16 at 0° F. and 91 mph |
| 14 | Ultem attached to primed carbon fiber airfoil | Cu foil attached with EA9395 and having a Ag adhesive feather | 15% | 22 at 0° F. and 91 mph |
| 15 | Primed carbon fiber airfoil | Cu braid attached with Devcon Epoxy Plus having wide border | 80% | 12 at 10° F. and 91 mph |
| 16 | Primed carbon fiber airfoil | Cu braid attached with EA9395 and having a Ag adhesive feather | 20% | 22 at 10° F. and 91 mph |

EXAMPLES 17 TO 20

Durability of Heaters on Carbon Fiber

Example 17. In this example a hybrid Cu—Ag-CNT interface is created that has a smooth transition The configuration shown in FIG. 2 was prepared. A 4 inch by 4 inch square carbon fiber panel was primed with Deft 44-GN-072, MIL-PRF-85582D low density epoxy primer, to 9-10 mil wet thickness. The primer was cured at room temperature for at least 24 h. The surface was scuffed with green scotchbrite pad. Cu braid (HexWik W55) was pressed between two aluminum plates to create the electrodes having a thickness of 0.005±0.001 inches thick and 0.05 inches wide. The braid was either used as received, scuffed with 240 grit sandpaper, or etched with ammonium hydroxide and cleaned in ultrasonic bath. Loctite EA9395 was prepared according to the manufacturer's instructions. Two narrow lines, 2 inch long, were placed in parallel 2 inch apart in the center of the coupon, using a mask to meter the quantity; the mask was removed. The selected leads were cut to 3 inch length and placed on top of the adhesive, leaving a 1 inch unattached. The system was cured under pressure at 65° C. for 1 h. The smooth, hybrid lead connection was created by applying a layer of Epotek EJ 2189 (prepared according to the manufacturer's instructions) at an angle to create a smooth transition from the Cu lead to the substrate. The system was cured for 4 h at 65° C.

Next a paint mask with 2 inch by 2 inch square opening was placed over the area. An aqueous dispersion of carbon nanotubes was sprayed in multiple passes over the area to provide a carbon nanotube network having a sheet resistance of 2 Ω/square. The mask was removed. Contact resistance testing was carried out at this point. Finally, the samples were coated with a polyurethane topcoat.

Example 18. Alternatively, a sample was created similar to Example 17 except all edges along the leads were fully encapsulated with the Epotek EJ2189, as opposed to Example 17 where only the edge that interfaced with CNTs was covered.

Example 19. In this example, a conductive adhesive was used as the structural adhesive. A 4 inch by 4 inch square carbon fiber panel was primed with Deft 44-GN-072, MIL-PRF-85582D low density epoxy primer, to 9-10 mil wet thickness. The primer was cured at room temperature for at least 24 h. The surface was scuffed with green Scotchbrite pad. Cu braid (HexWik W55) was pressed between two aluminum plates to create the electrodes having a thickness of 0.005±0.001 inches thick and 0.05 inches wide. The braid was either used as received, scuffed with 240 grit sandpaper, or etched with ammonium hydroxide and cleaned in ultrasonic bath. Epotek EJ 2189 (Ag epoxy) was prepared according to the manufacturer's instructions. Two narrow lines, 2 inch long, were placed in parallel 2 inch apart in the center of the coupon, using a mask to meter the quantity; the mask was removed. The selected leads were cut to 3 inch length and placed on top of the adhesive, leaving a 1 inch unattached. The system was cured under pressure at 65° C. for 4 h. Next a paint mask with 2 inch by 2 inch square opening was placed over the area. An aqueous dispersion of carbon nanotubes was sprayed in multiple passes over the area to provide a carbon nanotube network having a sheet resistance of 2 Ω/square. The mask was removed. Contact resistance testing was carried out at this point. Finally, the samples were coated with a polyurethane topcoat.

Example 20. A sample was created similar to Example 19, except the Cu was fully encapsulated with Ag epoxy. After the leads were attached with Epotek EJ 2189 and cured, a 2.5 mil thick mask with an opening of 0.125 in by 2.2 in was placed around the Cu leads to leave an open area along the edges of 0.01 in. Epotek EJ2189 was metered over the area, the mask was removed, and the system cured. The resulting interface had a rough edge due to the mask. The remaining coatings were prepared and are described in Example 19.

The results of testing Example 17, 19, and 20 are shown in Table 4. The configuration that employs an insulating structural adhesive has better bond strength (as indicated by 90° peel) than those that used the silver adhesive. Fully encapsulating the leads with silver adhesive, as shown by comparing Example 19 with Example 20, provides much better bond strength. We have two measures of contact resistance. One is by making point by point measurements along the leads. The other is by testing thermal uniformity under power. By both measures, the sample with smooth interfaces has better thermal uniformity, as evidence by low contact resistance and the $T_{max}$ versus the $T_{avg}$ at 2 W/in$^2$ power.

Examples 17 and 18 were placed in a salt fog chamber according to ASTM B117. Example 17 samples failed salt fog, via evidence of blistering, after, on average, less than 18 week. Example 18 passed salt fog exposure of 1000 h.

TABLE 4

Results of testing different hybrid configurations

| Sample | 90° Peel Strength (Lead to Substrate) (lbf/in) | Contact Resistance Across Interface | $[T_{max} - T_{avg}/T_{avg}]$ in ° F. at 2 W/in2 |
|---|---|---|---|
| Example 17 Untreated Leads | 7.2 | 17% | 15% (Tmax = 205) |
| Example 18 Scuff and Etch | 8.0 | 18% | 16% (Tmax = 220) |
| Example 19 Untreated leads | 2.7 | 27% | 12% (Tmax = 210) |
| Example 20 Untreated Leads | 4.7 | 22% | 18% (Tmax = 220) |
| Example 20 Scuff and Etch | 5.9 | 23% | 40% (Tmax = 257) |

EXAMPLE 21 TO 23

Icing Wind Tunnel Performance of Heater Arrays

Example 21. An array of 14 heaters capable of each operating at 375 W were prepared as follows. The heater arrays were created using a paint mask having the dimensions of the 14 heater cells—composed of 7 parallel heater strips—two heaters per strip—having a gap between strips of 0.0625 inch. The paint mask was yellow vinyl mask (vendor www.kapco.com supermask Stencil Yellow 6800FY). The paint mask was adhered to Ultem 1000 film (5 mil thick) that had first been roughened with sandpaper and wiped clean with isopropanol. Masking provided a region containing 7 parallel rectangles with dimensions of 1.5 inch by 40 inch, spaced apart by 0.0625 inch, as shown in Fig.

Copper leads were created by soldering pins to the backside of Cu foil leads that were 1.5 inch long, 5 mils thick, and 0.0625 in wide. 14 holes were punched into the Ultem where the pins and leads were to be located. The Cu leads were attached to the Ultem by placing the pins through the holes and using a layer of Loctite EA9395 as an adhesive. After curing, a second layer of conductive silver adhesive (Epotek EJ2189) was feathered along the edge of the Cu and the substrate. Carbon nanotube (CNT) dispersion was applied over the entire sheet, providing a conductive film capable of 360 W output for each heater. The mask was removed and the entire sheet was coated with a protective polyurethane clear coat (Emery 200 polyol, dibutyltin dilaurate, and tolonate HDT-LV2) having a thickness of approximately 50 μm. The heater sheet array was applied to the airfoil by coating with a thin layer of epoxy (Epotek 301) wrapping around the airfoil, attaching the pins into socket pass-through connectors, and curing at room temperature under pressure. The airfoil was T-300 carbon fiber epoxy honeycomb composite. The final article was coated with MILSPEC 85285 white polyurethane. The roughness along heater strips was less than 50 μm, where roughness is defined as the difference in height between the maximum and minimum profile.

Example 22. An array of 14 heaters capable of each operating at 375 W were prepared as follows. First, heater strips containing 2 heaters each were prepared. Yellow vinyl mask (vendor www.kapco.com supermask Stencil Yellow 6800FY) was cut to create a 1.5 inch by 40 inch square hole. This was attached to Ultem 1000 film (5 mil thick) that had first been roughened with sandpaper and wiped clean with isopropanol. Three small holes were created in parallel Three foil Cu leads, 1.5 inch long and having a connection pin attached to each, were attached to the Ultem, using Devcon Epoxy Plus epoxy adhesive on the backside and placing the connection pin through the hole. The end result was a rectangle having three parallel Cu leads, one at either edge and one at the center of the open region. A thin layer of polyurethane clearcoat (Emery 200 polyol, dibutyltin dilaurate, and tolonate HDT-LV2) was applied by spraying to the center of the masked area, but not touching in the Cu, giving a final dry film build of 1 mil. Over the entire region, carbon nanotube (CNT) dispersion was applied, providing a conductive film capable of 375 W output. The paint masked was removed and a protective polyurethane (Emery 200 polyol, dibutyltin dilaurate, and tolonate HDT-LV2) was applied over top. The excess edges were removed, leaving an insulating edge along the entire heater of 0.04 in. The heater strips were then attached to the leading edge of an airfoil composed of T-300 carbon fiber epoxy honeycomb composite. A total of 7 heater strips were applied in parallel, using an epoxy adhesive (Devcon Epoxy Plus) to attach each heater. The heaters were coated with MILSPEC 85285 white polyurethane. The ridges between heater strips was smoothed by applying a polystyrene filler and sanding. The final test article was coated with MILSPEC 85285 white polyurethane. The roughness along heater strips was greater than 500 μm due to the joint between heater strips.

Example 23. A single sheet containing multiple heater cells was prepared similar to Example 21. However, the spacing between heater strips was 0.125 inch. In addition, a different type of lead connection was made, as shown in Fig.

The test articles were tested for anti-icing and de-icing performance at the Boeing Research Aero-Icing Tunnel. The test matrix incorporated runs with a range of angles of attack, LWC values, droplet sizes, temperatures, power and heating profiles, and exposure times. Temperature ranged from 22° F. to −22° F., airspeeds ranged from 150 to 182 kts (278 km/h to 337 km/h), liquid water content from 0.36 to 0.56, with ice spray times ranging from 1:02 minutes to 9:45 minutes with 25 micron droplet sizes. All tests took place at 12,500 ft altitude using a Mod 1 spray nozzle.

A closed loop control and data acquisition system based on a National Instruments CompactRIO programmable automation controller. was used for this testing Key data acquisition (DAQ) parameters for the wing and inlet testing included heater AC voltage, current and power; and thermocouple temperatures by location. High speed closed-loop controls were used to drive the heaters to the desired surface temperatures, while ensuring that temperature, voltage, and current limits were not exceeded. Surface temperature was measured by thermocouple at location underneath the laminate heater, approximately 200 μm below the surface. Three Variac AC transformers were used as the power sources for this testing. The Variac outputs were run as inputs to the control system. The control system used solid state relays driven by the CompactRIO control loop to cycle power to the individual heaters to maintain the desired temperature. The Variac transformers provided sufficient power for the test articles.

A summary of the results for testing Examples 21 to 23 in conditions from 22° F. to −22° F. is shown in Table 5. Successful anti-icing was defined as having a clean heater area of at least 95% as determined by visual inspection. Successful de-icing was defined as having a clean heater area of at least 95% as determined by visual inspection, with negligible runback icing. Runback ice is defined as ice that has re-frozen aft of the leading edge area from a wet running condition.

Example 21 shows a configuration having a smooth surface and 0.0625 inch gaps applied to heat spreading substrate provides excellent anti-icing and de-icing performance. Example 22, with only slightly larger gaps—0.08 in—but considerably greater geometric roughness—shows presence of ice accretion at lower air temperature. Example 23, with good smoothness but larger gap—also fails to perform at low temperature. Specific test results for Example 6 are shown in Table 6.

TABLE 5

Results from anti-icing provided by parting strip and de-icing provided by lower runback heaters

| Temp: | 22° F. | 9.5° F. | −4° F. | −22° F. |
|---|---|---|---|---|
| Ex 21 | Successful anti/de-icing | Successful anti/de-icing | Successful anti/de-icing | Successful anti/de-icing |
| Ex 22 | Successful anti/de-icing | Successful anti/de-icing | Ice accretion observed during de-icing | Ice accretion observed during de-icing |
| Ex 23 | Successful anti/de-icing | Successful anti-icing. Moderate (slow) de-icing | Failed de-icing due to ice accretion. | Not tested |

TABLE 6

Results of testing Example 21 in an icing wind tunnel at various conditions

| Airspeed (KTAS) | BRAIT AOA | LWC | Droplet Size (μm) | Static Air Temp (° F.) | Time (min) | Flight Phase | Power needed for Successful Anti-Icing/ De-Icing (W/in2) | Surface Temperature (° F.) | Voltage (VAC RMS) |
|---|---|---|---|---|---|---|---|---|---|
| 162.34 | −2.38 | 0.47 | 25 | 22 | 3.01 | Climbout | 3.4 | 45 | 75 |
| 156.11 | 5.75 | 0.36 | 25 | 9.5 | 6.46 | Descent/Hold | 9.8 | 80 | 115 |
| 177.34 | −2.38 | 0.36 | 25 | −4 | 1.42 | Climbout | 12.5 | 85 | 125 |
| 153.84 | 1.63 | 0.36 | 25 | −4 | 2.15 | Descent/Hold | 12 | 85 | 125 |
| 182.34 | −2.38 | 0.38 | 25 | −22 | 1.00 | Climbout | 12.5 | 85 | 125 |
| 153.84 | 1.63 | 0.36 | 25 | −22 | 1.04 | Descent/Hold | 12.5 | 85 | 125 |

EXAMPLES 24 TO 26

Thermal Uniformity of Heaters with Heat Spreading Overlayer

Example 24. Thermal modeling was used to investigate the influence of a heat spreading material placed on top of the heater. The thermal conductivity was 15 W/mK and thickness was 50 μm. Thermal modeling shows that the surface temperature in the gap between two heaters—one with center surface temperature of 90° C. and one with center temperature of 83° C.—can be increased from approximately 78° C. to 85° C. by employing the heat spreading material. This 10% increase in surface heat is sufficient to prevent ice formation in these regions.

Figure 7:
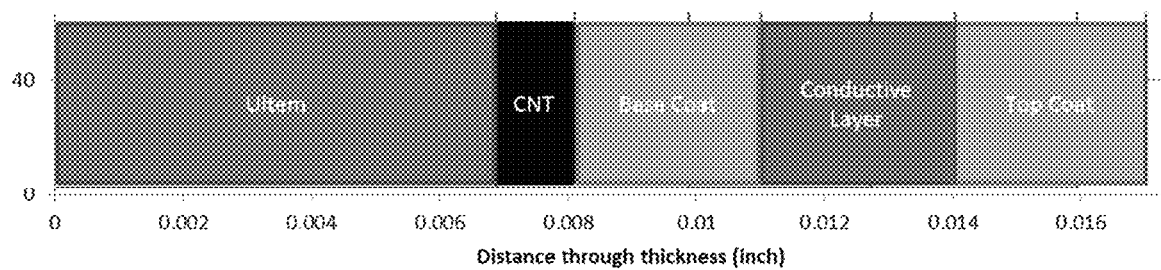
FIG. 7 schematically illustrates an example of a system having a heat spreading coating (conductive layer) on top of heater (CNT).
Figure 8:
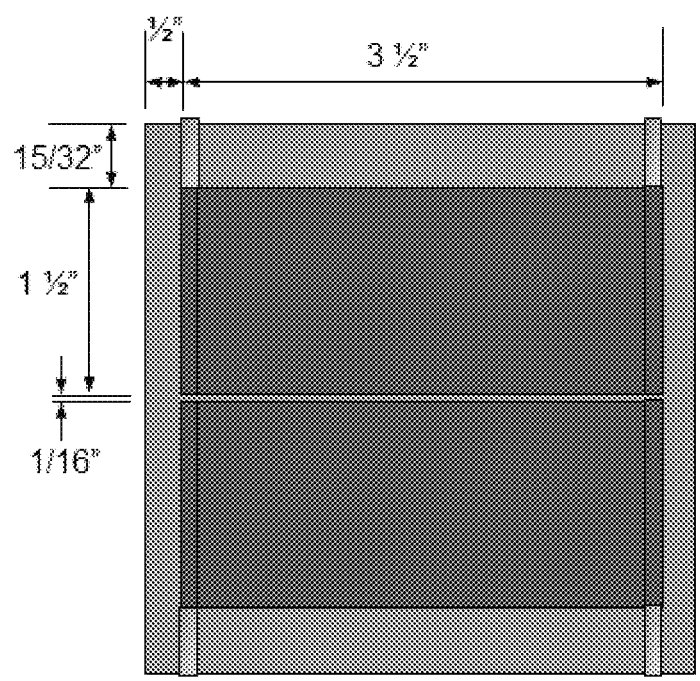
FIG. 8 schematically illustrates a configuration used to create samples for Example 25 and 26.

Example 25 and Example 26. Test coupons were prepared to study the benefit of a heat spreading layer. A heater array with two heater cells was fabricated on a carbon fiber coupon as shown in FIG. 7. Example 25 and 26 are replicates. The heater arrays were fabricated similar to Example 14, except the PEN was used instead of Ultem. Four Cu foil leads (5 mil thick and 0.125 inch wide) were attached to PEN that had been primed with MIL-PRF-85582D low density primer (Deft 44-GN-072) and scuffed, placed in the geometry shown in FIG. 8. The leads were attached using structural adhesive (DP460) and then a Ag epoxy feather (Epotek EJ2189), as described in Example 14. A paint mask was attached to the substrate, using 3M fine line tape as a mask between the two heaters, leaving two rectangular windows where CNT layer was applied from an aqueous dispersion using seven successive passes. After drying, the paint masks were removed from the samples. The samples were dried overnight and then washed with dilute phosphoric acid (pH 2.5). A mist coat of solvent-based primer, was applied to the dried coating. After curing, the heater array on PEN was attached to a flat, rigid carbon fiber substrate using epoxy adhesive. The entire sample was then coated with grey polyurethane and cured per accelerated cure in MILSPEC 85285.

Examples 25 and 26 were placed under forced convection (fan) at −4° C. for at least 5 min. Then, each heater was powered at 0.5 W/in2 and a thermal image of the samples was captured after 30 s using a FLIR thermal imaging camera. These images served as baseline images of the heating uniformity before adding a heat spreading layer. Next, a sheet of TFP Optiveil 20404E Nickel Coated Carbon Fiber (11 g/m2 and 110 μm) was applied over top of Example 25 and Example 26. The veil was attached using epoxy coating from US Composite Epoxy, which was applied as a thin layer and smoothed over top. The sample was coated again with grey polyurethane and cured by accelerated curing. The samples were powered under forced convection as previous, and thermal images were captured.

The results of thermal imaging Example 25 and 26 before and after adding a heat spreading layer are quantified in Table 7. Tavg was determined using the FLIR software by drawing a box around the entire heating area and calculating the average temp. The cold gap temperature was determine by measuring the lowest temperature in the gap between heaters. The data shows that adding a heat spreading layer does increase the temperature of the cold gap. Also important is that the addition of ~150 μm more material over the heater (heat spreading layer plus top coat) does not decrease the heat-up rate. It should be noted that these samples are collected after 30 s; neither sample has reached thermal equilibrium. This measurement time was chosen to accentuate the differences in thermal uniformity, which are most noticeable before heat is spread into the substrate.

Another important attribute of adding the heat spreading layer is that it decreases the width of the cold zone, i.e. the width of cold area between the heaters. Without the heat spreading layer, the cold zone is slightly larger than predicted due to geometry (~2.0%). The addition of the heat spreading layer can cut this value almost in half, which has a significant benefit in reducing ice accretion. The heat spreading layer also made imperfections in the thermal uniformity appear more diffuse.

TABLE 7

Results from thermal imaging Examples 25 and 26, before and after adding a heat spreading layer.

| | | Heater 1 Tavg (F.) | Heater 2 Tavg (F.) | Tmin | Cold Gap (Tmin − Tavg)/Tavg | Width of Cold Gap/Width of Two Heaters % |
|---|---|---|---|---|---|---|
| Example 25 | before heat spreading layer | 63.2 | 64.0 | 59.1 | −7.1% | 2.5% |
| | after heat spreading layer on top | 68.4 | 67.0 | 63.2 | −6.6% | 1.6% |
| Example 26 | before heat spreading layer | 65.8 | 67.1 | 61.8 | −7.0% | 2.6% |
| | after heat spreading layer on top | 69.7 | 68.8 | 65.0 | −6.1% | 1.1% |

EXAMPLE 27

Influence of Roughness on Ice Accretion in Icing Wind Tunnel

An aspect of this invention is that it produces heaters that are just below the surface, less than 500 μm beneath the surface. The heaters can be fashioned into an array of heaters that can be individually powered to maintain uniform surface temperature of airfoil and prevent icing. An important aspect is that the insulating joints between heaters are smooth after finishing. As will be shown by Example 27, edges created by the methods described have roughness less than 50 μm, which prevent ice accretion at these local regions.

A 14 cell heater array was prepared on PEN using the techniques described in previous examples to create the hybrid electrode. In short, a sheet of PEN was cut to size. Pass-through holes for 21 pin connectors were placed in the locations for leads according to the drawing. Next the PEN was coated with Deft 44-GN-072 and dried overnight. The film was then scuffed. Cu foil electrodes (5 mil thick; 0.125 inch wide; and 1.375 inch long) with pin connectors soldered to them were attached to the PEN with 3M DP460, placing the pin connectors through the holes, and cured according to manufacturer's instructions, Next, the Epotek EJ 2189 Ag epoxy was applied along the lead edges to create the hybrid interface. After curing, the lead Ag epoxy was scuffed to create a smooth finish. A mask was created by adhering a paint stencil to the coated PEN and then using 3 M fine line tape to mask the region between heaters. A CNT dispersion of SWNTs and sodium hyaluronate in water was applied to the surface in several successive coats, drying between coatings, to achieve a sheet resistance on the film of ~1.2 Ω/square. The masking was removed and the sample was dried overnight. The CNT array was washed with dilute phosphoric acid (pH ~2.5) and then water. After drying overnight, the entire sheet was coated with a mist coat of Deft Solvent primer 44GN0 (~2-3 mil wet). Finally, a layer of MIL-PRF-85285 top coat white (Deft 03-W-140) Color 27925 was applied. The material was cured by accelerating curing and conditioned in warm humid environment. The heater array on PEN was applied to a pre-prepared airfoil having embedded pass-through connectors and thermocouples in the surface. DP 460 was applied to the part, the pins were located into their respective holes, and the heater array applied using a vacuum bag; the CNT heaters faced up. The final assembly was coated with Deft 03-W-149. After all processing, the resistance at the leads was ~21 S2 for the different heaters, or 1.58 Ω/square.

The edges heights can be varied by choice of the mask material. The key parameters are the mask's hydrophobicity (as measured by contact angle with water), the porosity and roughness of the mask, the thickness of the mask, and its tack or adhesiveness with the substrate. A tall edgeline occurs where the CNT dispersion tends to well-up along the mask edge during drying. When the mask is removed, this welled-up region appears as an edgeline. Generally, the edge lines become thicker as more CNT dispersion is applied, and thus is a function of the CNT layer thickness.

The edge heights were measured using a surface profilometer. To measure edge height, the profilometer was drawn across the tape line such that the path was perpendicular to the tape edge. The difference between the maximum height and the minimum height in the immediate vicinity of the tape edge was recorded. The results for different mask materials are shown in the table below.

| Mask Material | tape thickness (μm) | contact angle of water (°) | best to worst for unmasking (1 = highest) | visual assessment (1 highest) | surface profilometer of max tape edge |
|---|---|---|---|---|---|
| Scotch Blue Painters tape original 2090 | 102 | 85 | 2 | 1 | 0.002 |
| Scotch Painters tape with Never Wet hydrophobic coating | 127 | 155 | 6 | 2 | 0.002 |
| Supermask Yellow with NeverWet hydrophobic coatings | 135 | 148 | 8 | 4 | 0.004 |
| 3M fine line tape (vinyl) | 119 | 104 | 3 | 5 | 0.006 |
| Supermask Yellow vinyl | 114 | 106 | 4 | 6 | 0.004 |
| Airtech Int'l Flashbreaker 2 | 76 | 98 | 1 | 7 | 0.005 |

Figure 9:
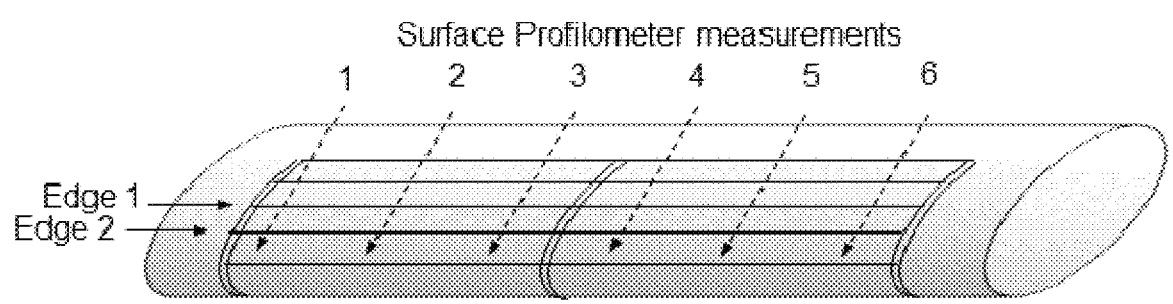
FIG. 9 illustrates a surface for profilometer measurements in Example 27.

For the 14 cell heater array tested in Example 27, the edge lines were characterized along two tape edges, equally spaced from left to right, as illustrated in FIG. 9. The six measurements are reported along with their averages and standard deviations.

The edge heights measured are shown in the table below. There is a statistically significant difference ($p=5E-5$) between the edged heights measured for 1 and 2. The edge height for edge 1 was 29 um larger than that for edge 2.

TABLE

Edge height measurements for the two edges of the wing shown in FIG. 9.

| Tape Edge # | Ice Accretion (Y/N) | Edge Height (inches) | | | | | | | Edge Height (um) |
|---|---|---|---|---|---|---|---|---|---|
| | | Rep 1 | Rep 2 | Rep 3 | Rep 4 | Rep 5 | Rep 6 | Avg ± StDev | Avg ± StDev |
| 1 | Y | 0.003 | 0.002 | 0.0025 | 0.0025 | 0.002 | 0.003 | 0.0025 ± 0.0004 | 64 ± 11 |
| 2 | N | 0.001 | 0.001 | 0.0005 | 0.001 | 0.001 | 0.0015 | 0.0010 ± 0.0003 | 25 ± 8 |

The airfoil was placed in an icing wind tunnel at 180 kts, 0.36 LWC, and 9.5° F. The heater array was powered to keep the surface clean, by maintaining similar surface temperature. Nonetheless, it was found that Tape edge 1 shows visible ice accretion while tape edge 2 does not show ice accretion. The tape edge that showed observable ice accretion was 64±11 μm while that for the tape edge that showed no ice accretion was 25±8 μm.

What is claimed:
1. A lightweight and compact carbon-based heating device disposed on a substrate, comprising:
two electrodes, each of which is bonded to the substrate by an adhesive;
wherein the edge of the electrode closest to the substrate is defined as the bottom of the electrode and the edge furthest from the substrate is defined as the top of the electrode and wherein the edges of the electrode between the top and bottom are defined as the sides of the electrode;

a conductive polymer bonded to at least one side of each electrode, wherein the conductive polymer is thickest near the bottom of each electrode and thinnest near the top of each electrode so as to form a sloped surface of the conductive polymer on the sides of each electrode; and a conductive CNT heater layer coated over the sloped sides of the conductive polymer and disposed between the sloped sides of the conductive polymer.

2. The device of claim 1 wherein the sloped surface as measured from the bottom to the top of the electrode has an angle of between 10 and 80 degrees from horizontal.

3. The device of claim 1 further comprising a heat-spreading layer disposed above or below the conductive CNT film.

4. The device of claim 2 wherein the conductive polymer comprises silver dispersed in a polymer.

5. The device of claim 2 wherein the electrodes have a rectangular cross-section in the direction perpendicular to length and wherein the sides of the electrodes that face each other are encapsulated by the conductive polymer.

6. The device of claim 2 wherein the electrodes are disposed on a substrate and wherein the electrodes are encapsulated by the conductive polymer except for the bottom sides of the electrodes that are facing the substrate.

7. The device of claim 1 further comprising a heat spreading layer disposed above the conductive CNT heater layer.

8. The device of claim 1 wherein the sloped surface as measured from the bottom to the top of the electrode has an angle of between 30 and 60 degrees from horizontal.

9. A carbon-based heating device or intermediate heating device, comprising:
a planar array of CNT heater cells disposed in a layer;
wherein each CNT heater cell comprises a layer of CNTs disposed between two electrodes and wherein each of the two electrodes are attached to the same substrate;
and polymer-filled joints disposed between the CNT heater cells;
wherein the joints have a roughness of no more than 50 μm, wherein the level of "roughness" means that pro-filometry does not show any steps of greater than 50 μm over a linear, horizontal distance of 10 μm or less over the planar array.

10. The carbon-based heating device of claim 9 wherein each of the two electrodes is bonded to the substrate by an adhesive;
wherein the edge of the electrode closest to the substrate is defined as the bottom of the electrode and the edge furthest from the substrate is defined as the top of the electrode and wherein the edges of the electrode between the top and bottom are defined as the sides of the electrode;
a conductive polymer bonded to at least one side of each electrode, wherein the conductive polymer is thickest near the bottom of each electrode and thinnest near the top of each electrode so as to form a sloped surface of the conductive polymer on the sides of each electrode; and
a conductive CNT heater layer disposed between the sloped sides of the conductive polymer.

11. A carbon-based heating device, comprising:
a planar array of CNT heater cells disposed in a single sheet;
polymer-filled joints disposed between the CNT heater cells; and
a heat-spreading layer that is integral to and adjacent to the single sheet;
wherein the heat-spreading layer has a thermal conductivity of at least 10 W/mK.

12. The carbon-based heating device of claim 11 comprising:
two electrodes, each of which is bonded to the substrate by an adhesive;
wherein the edge of the electrode closest to the substrate is defined as the bottom of the electrode and the edge furthest from the substrate is defined as the top of the electrode and wherein the edges of the electrode between the top and bottom are defined as the sides of the electrode;
a conductive polymer bonded to at least one side of each electrode, wherein the conductive polymer is thickest near the bottom of each electrode and thinnest near the top of each electrode so as to form a sloped surface of the conductive polymer on the sides of each electrode; and
a conductive CNT heater layer disposed between the sloped sides of the conductive polymer.

13. A carbon-based heating device or intermediate heating device, comprising:
a planar array of CNT heater cells disposed in a layer;
each CNT heater cell comprising two electrical leads attached to the same substrate and a CNT heater layer disposed between, and in the plane of, the leads;
at least one polymeric layer disposed over the CNT heater layer and over the electrical leads; and
the at least one polymeric layer having a surface exposed to the air and having a surface area of at least 5 cm×5 cm that extends over the planar array, the surface having a thermal uniformity characterizable by test conditions wherein the device is powered to 0.5 W/6.5 cm$^2$ for 120 s,
wherein an area of at least 5 cm×5 cm on the surface increases in temperature by at least 10° C. and there is no 1 cm×1 cm square within the 5 cm×5 cm area that has a temperature greater than 5° C. than the average temperature of the 5 cm×5 cm square.

14. The carbon-based heating device or intermediate heating device of claim 13 having a thermal uniformity such that non-uniformity is less than 20% where non-uniformity is measured at (Tmax-Tavg)/Tavg when powered at 2 W/in2 under free convection; and wherein Tavg is determined by measuring the average temperature of different pixels in the thermal image across surface of the entire heating device.

15. The carbon-based heating device or intermediate heating device of claim 13 having a thermal uniformity characterizable by test conditions wherein the device is powered to 0.5 W/6.5 cm$^2$ for 120 s wherein the temperature differential identifiable by infrared temperature profiling at any location within the 5 cm×5 cm square is no more than 1° C. than the average temperature of the 5 cm×5 cm square.

16. The carbon-based heating device or intermediate heating device of claim 14 having a thermal uniformity characterizable by test conditions wherein the device is powered to 0.5 W/6.5 cm$^2$ for 120 s wherein the temperature differential identifiable by infrared temperature profiling at any location over the surface of the entire device is no more than 3° C. than the average temperature of the 5 cm×5 cm square.

17. A carbon-based heating device or intermediate heating device, comprising:
   a planar array of CNT heater cells disposed in a layer;
   wherein each CNT heater cell comprises a CNT heater film and two electrodes;
   and polymer-filled joints disposed between the CNT heater cells;
   wherein a contact resistance of a heater cell is 30% or less.

18. The device of claim 17 comprising:
   two electrodes, each of which is bonded to the substrate by an adhesive;
   wherein the edge of the electrode closest to the substrate is defined as the bottom of the electrode and the edge furthest from the substrate is defined as the top of the electrode and wherein the edges of the electrode between the top and bottom are defined as the sides of the electrode;
   a conductive polymer bonded to at least one side of each electrode, wherein the conductive polymer is thickest near the bottom of each electrode and thinnest near the top of each electrode so as to form a sloped surface of the conductive polymer on the sides of each electrode; and
   a conductive CNT heater layer disposed between the sloped sides of the conductive polymer.

19. The device of claim 17 wherein a contact resistance of a heater cell is in the range of 15 to 30%.

20. The carbon-based heating device or intermediate heating device of claim 17, further comprising: polymer-filled joints disposed between the CNT heater cells; wherein the joints have a roughness of no more than 50 μm, wherein the level of "roughness" means that profilometry does not show any steps of greater than 50 μm over a linear, horizontal distance of 10 μm or less over the planar array.

* * * * *